United States Patent
Park et al.

(10) Patent No.: US 6,473,620 B1
(45) Date of Patent: Oct. 29, 2002

(54) METHOD FOR TRACING CALL ESTABLISHING MESSAGE

(75) Inventors: Soo Yong Park, Ichon-Si; Dae Koo Kang, Anyang-Si; Kye Chol Cho, Ichon-Si, all of (KR)

(73) Assignee: Hyundai Electronics Ind. Co., Ltd., Ichon-Si (KR)

( * ) Notice: Subject to any disclaimer, the term of this patent is extended or adjusted under 35 U.S.C. 154(b) by 0 days.

(21) Appl. No.: 09/497,132

(22) Filed: Feb. 3, 2000

(30) Foreign Application Priority Data

Apr. 28, 1999 (KR) .............................. 99-15244

(51) Int. Cl.$^7$ ................................ H04Q 7/20
(52) U.S. Cl. ................ 455/458; 455/414; 455/423; 370/320
(58) Field of Search ................ 455/404, 410, 455/411, 414, 422, 423, 450, 456, 457, 458, 560; 379/227, 228, 229, 230; 370/320, 335, 342, 441

(56) References Cited

U.S. PATENT DOCUMENTS

| | | | |
|---|---|---|---|
| 4,591,665 A | | 5/1986 | Foster et al. |
| 5,031,204 A | * | 7/1991 | McKernan ................ 455/560 |
| 5,504,939 A | * | 4/1996 | Mayrand et al. ............ 455/450 |
| 5,659,604 A | | 8/1997 | Beckmann |
| 5,819,171 A | * | 10/1998 | Hoogerwerf et al. ....... 455/410 |
| 5,873,040 A | * | 2/1999 | Dunn et al. ................. 455/456 |
| 5,901,342 A | | 5/1999 | Heiskari et al. |
| 5,978,669 A | * | 11/1999 | Sanmugam ................ 455/410 |
| 6,144,859 A | * | 11/2000 | LaDue ....................... 455/410 |

* cited by examiner

*Primary Examiner*—Nay Maung
(74) *Attorney, Agent, or Firm*—Jacobson Holman, PLLC

(57) ABSTRACT

A method for tracing a call establishing message between a specific mobile station and a specific channel element or between the specific channel element and a specific vocoder in a code division multiple access mobile communication system. A base station control processor receives information of a mobile station or channel element to be traced and the type of the call establishing message to be traced, from an operator. When the specific mobile station sends a call establishing request, the processor determines whether the specific mobile station is the mobile station to be traced. The processor sends a traffic channel establishing message to the specific channel element if the specific mobile station is the mobile station to be traced. Alternatively, the processor sends the traffic channel establishing message to the specific channel element if the specific channel element is the channel element to be traced. When the call establishing message to be traced is transmitted and received, the specific channel element sends a trace report message to the processor. Then, the processor sends the traced result of the call establishing message to a terminal of the operator. Therefore, the operator can easily recognize message transmission/reception states of the system upon call establishment, thereby enhancing a communication rate of the mobile station.

10 Claims, 4 Drawing Sheets

METHOD FOR TRACING CALL ESTABLISHING MESSAGE

BACKGROUND OF THE INVENTION

1. Field of the Invention

The present invention relates in general to mobile communication systems employing a code division multiple access (CDMA) technique, such as a personal communication service system (PCS) and digital cellular system (DCS), and more particularly to a method for tracing a call establishing message, in which messages transmitted and received between a channel element and a vocoder and between the channel element and a mobile station are traced under the setting of an operator, so that the operator can readily recognize the situation of a system through his terminal.

2. Description of the Prior Art

With reference to FIG. 1, there is shown in block form the construction of a general CDMA mobile communication system, which is operated in the following manner.

When a mobile station (MS) 10 in a PCS or DCS attempts a call connection, a base station control processor (BCP) 21 in a base transceiver station (BTS) 20 assigns a channel element (CE) 22 and other BTS traffic resources related to the MS 10, and a call control processor (CCP) 31 in a base station controller (BSC) 30 assigns a transcoder/selector bank (TSB) 32 and other BSC traffic resources related to the MS 10. The MS 10 attempting the call connection, the assigned TSB 32 in the BSC 30 and the assigned CE 22 in the BTS 20 initially transmit and receive various call establishing messages among them, in order to enter a speech state.

Consequently, the mobile station attempting the call connection can enter the speech state and communicate with a called mobile station.

On the other hand, when the speech state is not normally established, an analysis must be made of message transmission/reception for call establishment between the traffic channel element and vocoder or between the traffic channel element and mobile station.

However, in a conventional method for tracing a message for establishing a call, specific equipment (for example, a past card) is used to receive all messages transmitted and received for the call establishment between the channel element and vocoder and between the channel element and mobile station. Then, whether the message transmission and reception between the channel element and vocoder or between the channel element and mobile station have been normally performed can be determined by selecting and analyzing only a specific one of all the messages. As a result, the conventional call establishing message tracing method has the trouble of receiving all messages and extracting a particular message from the received messages. Further, the extracted message is so complicated that only an associated developer may be able to properly analyze it.

SUMMARY OF THE INVENTION

Therefore, the present invention has been made in view of the above problems, and it is an object of the present invention to provide a method for tracing a call establishing message, in which messages transmitted and received between a channel element and a vocoder and between the channel element and a calling mobile station are traced under the setting of an operator, so that the operator can readily recognize a call establishing situation of a system, thereby enhancing a communication rate of the calling mobile station.

In accordance with the present invention, the above and other objects can be accomplished by a provision of a method for tracing a call establishing message between a specific mobile station and a specific channel element or between the specific channel element and a specific vocoder in a code division multiple access mobile communication system. A base station control processor receives information of a mobile station or channel element to be traced and the type of the call establishing message to be traced, from an operator. When the specific mobile station sends a call establishing request, the processor determines whether the specific mobile station is the mobile station to be traced. The processor sends a traffic channel establishing message to the specific channel element if the specific mobile station is the mobile station to be traced. Alternatively, the processor sends the traffic channel establishing message to the specific channel element if the specific channel element is the channel element to be traced. When the call establishing message to be traced is transmitted and received, the specific channel element sends a trace report message to the processor. The processor sends the traced result of the call establishing message to a terminal of the operator upon receiving the trace report message.

Therefore, the operator can easily recognize message transmission/reception states of the system upon call establishment, thereby enhancing a communication rate of the mobile station.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
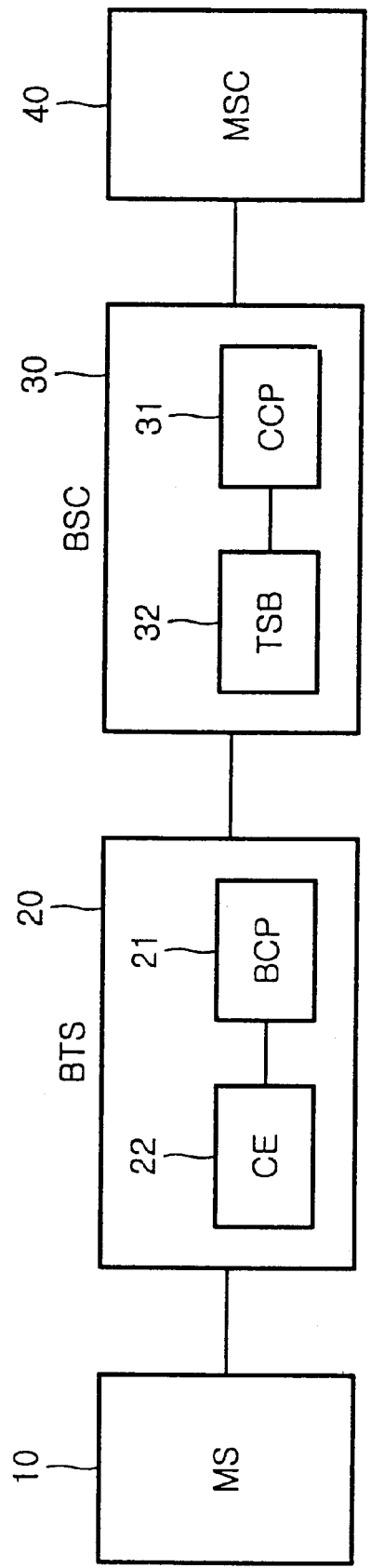
FIG. 1 is a block diagram of a general CDMA mobile communication system.
Figure 2:
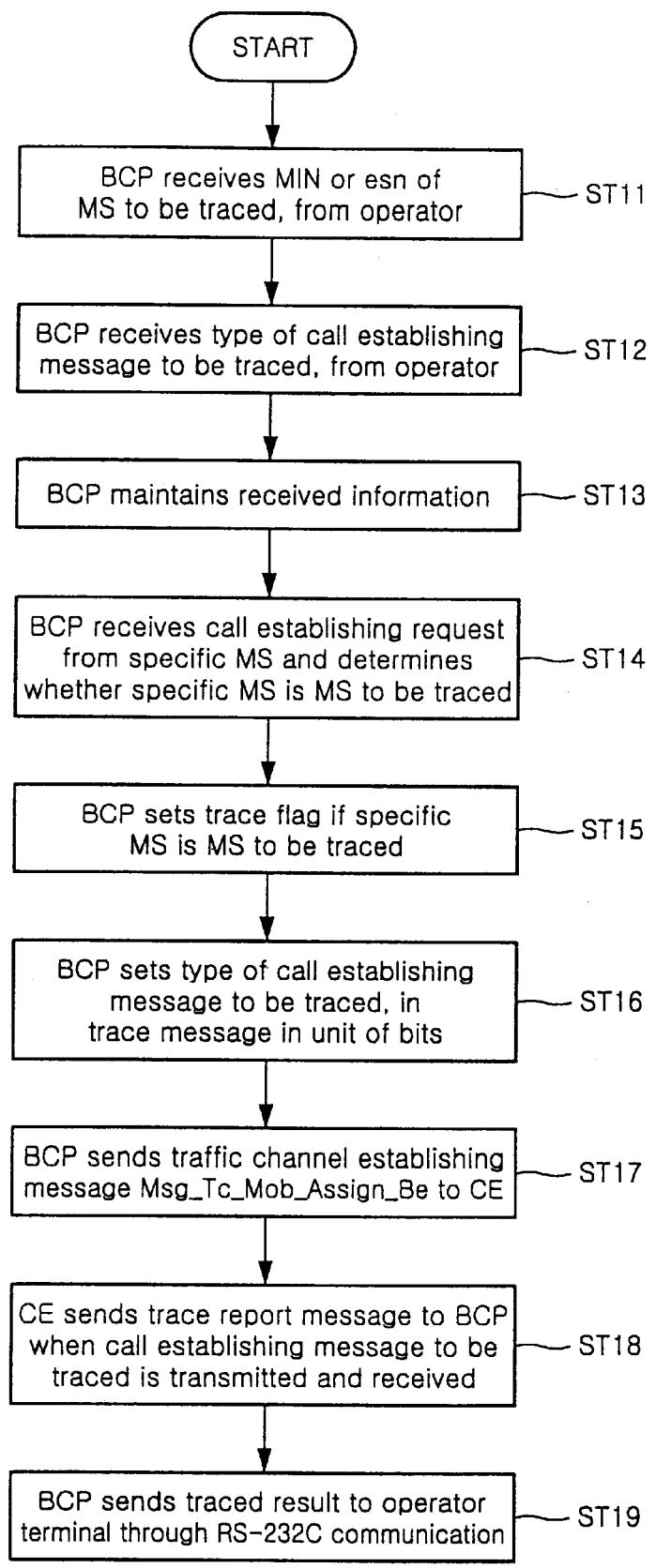
FIG. 2 is a flowchart illustrating a method for tracing a call establishing message between a mobile station and a channel element in accordance with a first embodiment of the present invention.

FIG. 2 is a flowchart illustrating a method for tracing a call establishing message between a specific mobile station (MS) and a specific channel element (CE) in accordance with a first embodiment of the present invention.

As shown in FIG. 2, the call establishing message tracing method comprises the first step (ST11–ST13) of receiving information of an MS to be traced and the type of the call establishing message to be traced, from an operator, the second step (ST14–ST17) of determining whether the specific MS 10 is the MS to be traced, upon receiving a call establishing request from the specific MS 10, and sending a traffic channel establishing message Msg_Tc_Mob_

Assign_Be to the specific CE 22 if the specific MS 10 is the MS to be traced, the third step (ST18) of receiving a trace report from the specific CE 22 receiving the traffic channel establishing message Msg_Tc_Mob_Assign_Be, when the call establishing message to be traced is transmitted and received, and the fourth step (ST19) of sending the traced result of the call establishing message to a terminal of the operator upon receiving the trace report from the specific CE 22.

The above processing is performed by a base station control processor (BCP) 21.

The traffic channel establishing message Msg_Tc_Mob_Assign_Be sent at the above second step (ST14–ST17) includes a trace flag one-to-one corresponding to the specific CE 22 for indicating whether a tracing function will be performed with respect to the specific CE 22, and a trace message composed of 16 bits for indicating the type of the call establishing message to be traced.

Figure 3:
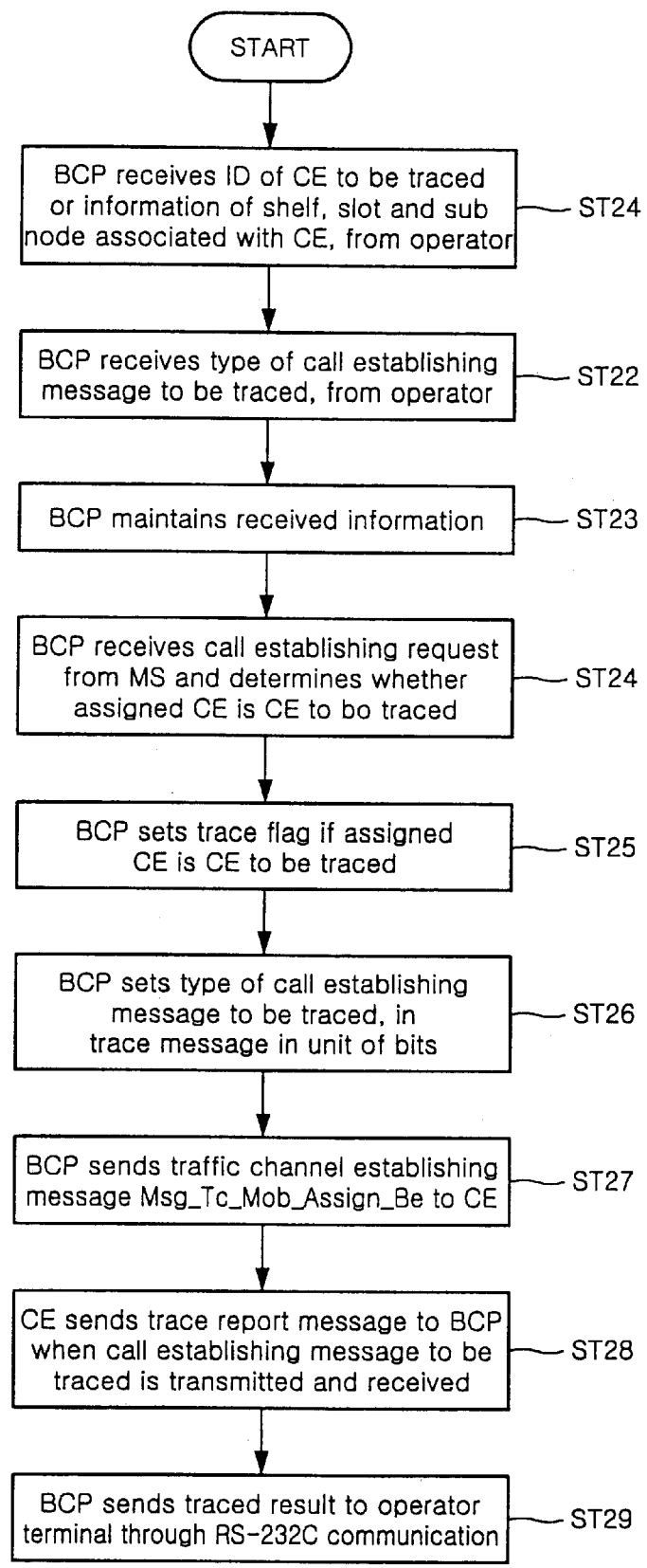
FIG. 3 is a flowchart illustrating a method for tracing a call establishing message between a channel element and a vocoder in accordance, with a second embodiment of the present invention.

FIG. 3 is a flowchart illustrating a method for tracing a call establishing message between a specific channel element (CE) and a specific vocoder (TSB) in accordance with a second embodiment of the present invention.

As shown in FIG. 3, the call establishing message tracing method comprises the first step (ST21–ST23) of receiving information of a CE to be traced and the type of the call establishing message to be traced, from an operator, the second step (ST24–ST27) of assigning the specific CE 22 upon receiving a call establishing request from a specific mobile station, determining whether the specific CE 22 is the CE to be traced and sending a traffic channel establishing message Msg_Tc_Mob_Assign_Be to the specific CE 22 if the specific CE 22 is the CE to be traced, the third step (ST28) of receiving a trace report from the specific CE 22 receiving the traffic channel establishing message Msg_Tc_Mob_Assign_Be, when the call establishing message to be traced is transmitted and received, and the fourth step (ST29) of sending the traced result of the call establishing message to a terminal of the operator upon receiving the trace report from the specific CE 22. The above processing is performed by the BCP 21.

The information of the CE received at the above first step (ST21–ST23) includes an identifier (ID) of the CE or. information of a shelf, slot and sub node in which the CE is located.

The traffic channel establishing message Msg_Tc_Mob_Assign_Be sent at the above second step (ST24–ST27) includes a trace flag one-to-one corresponding to the specific CE 22 for indicating whether a tracing function will be performed with respect to the specific CE 22, and a trace message composed of 16 bits for indicating the type of the call establishing message to be traced.

Now, a detailed description will be given of the method for tracing the call establishing message between the specific mobile station and 'specific channel element or between the specific channel element and specific vocoder in accordance with the present invention, with reference to FIG. 4.

First, the BCP 21 receives trace information for the tracing of the call establishing message between the specific MS 10 and specific CE 22 from the operator at steps ST11 and ST12 or trace information for the tracing of the call establishing message between the specific CE 22 and specific vocoder (TSB) 32 from the operator at steps ST21 and ST22. In other words, for the tracing of the call establishing message between the MS 10 and CE 22, the BCP 21 receives a mobile identification number (MIN) or an electronic serial number (ESN) of an MS to be traced and the type of the call establishing message to be traced, from the operator, respectively, at steps ST11 and ST12. For the tracing of the call establishing message between the CE 22 and TSB 32, the BCP 21 receives information of a CE to be traced, or an identifier (ID) of the CE or information of a shelf, slot or sub node in which the CE is located, and the type of the call establishing message to be traced, from the operator, respectively, at steps ST21 and ST22. Then, the BCP 21 maintains the trace information received from the operator at step ST13 or ST23.

Thereafter, when the specific MS 10 sends a call establishing request, the BCP 21 receives a traffic resources assignment request and assigns traffic resources such as a trunk, frame offset and output power as well as the specific CE 22. Further, the BCP 21 notifies the CE 22 of information regarding the assigned traffic resources.

Then, the BCP 21 determines at step ST14 on the basis of the mobile station MIN or ESN whether the specific MS 10 is the MS to be traced or at step ST24 on the basis of the channel element ID or the location information whether the specific CE 22 is the CE to be traced.

Unless the specific MS 10 is the MS to be traced or unless the specific CE 22 is the CE to be traced, the BCP 21 sets a trace flag to FALSE in order not to perform the tracing function and appends the set trace flag to a traffic channel establishing message Msg_Tc_Mob_Assign_Be at step ST15 or ST25. Then, the BCP 21 sends the resultant traffic channel establishing message to the specific CE 22.

To the contrary, if the specific MS 10 is the MS to be traced or the specific CE 22 is the CE to be traced, the BCP 21 appends the trace information to the traffic channel establishing message Msg_Tc_Mob_Assign_Be at steps ST15 and ST16 or steps ST25 and ST26 in order to perform the tracing function and sends the resultant traffic channel establishing message to the specific CE 22 at step ST17 or ST27.

In other words, the BCP 21 sets the trace flag to TRUE in order to perform the tracing function with respect to the specific MS 10 and the specific CE 22 and further sets the type of the call establishing message to be traced, in a trace message. Then, the BCP 21 appends the set trace flag and trace message to the traffic channel establishing message Msg_Tc_Mob_Assign_Be and sends the resultant traffic channel establishing message to the specific CE 22.

The trace information, or the trace flag and trace message, contained in the traffic channel establishing message Msg_Tc_Mob_Assign_Be can be defined as follows. Namely, the BTS 20 comprises the CE 22 one-to-one corresponding to the MS 10, and the trace flag one-to-one corresponds to the CE 22 to determine whether the tracing function will be performed with respect to the CE 22.

The trace message contains information about the type of a message to be traced, among a large number of messages transmitted and received among the MS 10, BTS 20, BSC 30 and MSC 40 upon initial call establishment or handoff.

That is, the trace message is composed of 16 bits, each of which has trace enable/disable information regarding a message to be traced.

The following messages are traceable among a large number of messages transmitted and received among the MS 10, BTS 20, BSC 30 and MSC 40.

Call establishing messages traceable upon the initial call establishment are as follows:

Time_sync: a message (51 in FIG. 4) which the TSB 32 sends to the CE 22 for time synchronization with the CE 22;

Time_sync: a message (53 in FIG. 4) which the CE 22 sends to the TSB 32 to inform it that a link has been established between the CE 22 and TSB 32;

Vs_mob_acq_ctl_msg: a message (56 in FIG. 4) which the CE 22 sends to the TSB 32 to inform it that the CE 22 has obtained a reverse traffic channel preamble;

Tc_ack_ctl_msg: a message (58 in FIG. 4) which the TSB 32 sends to the CE 22 to acknowledge the message Vs_mob_acq_ctl_msg;

Bs_Ack_Order: a message (61 in FIG. 4) which the TSB 32 sends to the CE 22 to inform the MS 10 that a traffic channel is available; and Ms_Ack_Order: a message (63 in FIG. 4) which the MS 10 sends to the CE 22 to acknowledge the message Bs_Ack_Order.

Although the handoff to be performed is not herein shown, call establishing messages traceable upon the handoff are as follows:

Pilot_Strength_Measurement_Message: a message which the MS 10 sends to the CE 22 to report a pilot strength of the BTS 20 to the CE 22;

Handoff Direction Message: a message which the CE 22 sends to the MS 10 to direct it to perform the handoff; and Handoff Completion Message: a message which the MS 10 sends to the TSB 32 to inform it that the handoff has been completed.

The tracing function is applied to the above messages, and the 16-bit trace message includes information about which one of those messages will be traced. Each of the 16 bits of the trace message has trace enable/disable information as follows:

bit 0: Time_sync (TSB→CE) trace enable/disable flag;
bit 1: Time_sync (CE→TSB) trace enable/disable flag;
bit 2: Vs_mob_acq_ctl_msg (CE→TSB) trace enable/disable flag;
bit 3: Tc_ack_ctl_msg (TSB→CE) trace enable/disable flag;
bit 4: Bs_Ack_Order (TSB→CE) trace enable/disable flag;
bit 5: Ms_Ack_Order (MS→CE) trace enable/disable flag;
bit 6: Pilot_Strength_Measurement_Message (MS→CE) trace enable/disable flag;
bit 7: Handoff Direction Message (CE→MS) trace enable/disable flag;
bit 8: Handoff Completion Message (MS→TSB) trace enable/disable flag;
bit 9: reserved;
bit 10: reserved;
bit 11: reserved;
bit 12: reserved;
bit 13: reserved;
bit 14: reserved; and
bit 15: reserved.

Thereafter, upon receiving the traffic channel establishing message Msg_Tc_Mob_Assign_Be for the tracing function from the BCP 21, the specific CE 22 sends a trace report message Msg_Cc_Call_Debug_Eb to the BCP 21 at step ST18 or ST28 when the call establishing message to be traced is transmitted and received.

Figure 4:
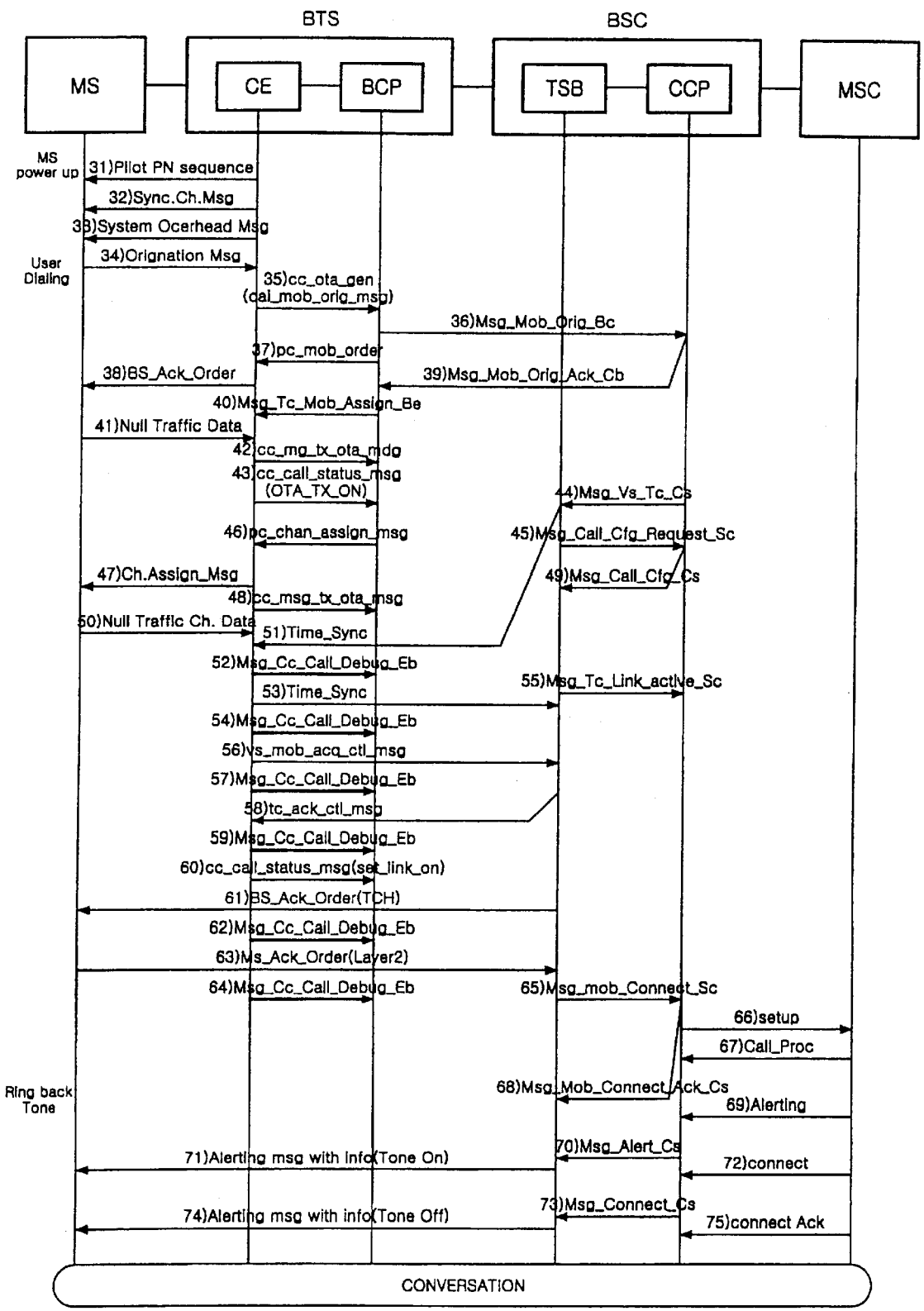
FIG. 4 is a view illustrating message transmission/reception flows for the tracing of call establishing messages among a mobile station, a channel element and a vocoder in accordance with the present invention.

For example, in the case where all of the bit 0 to bit 5 of the 16-bit trace message are set to "1", the CE 22 sends trace report messages Msg_Cc_Call_Debug_Eb 52, 54, 57, 59, 62 and 64 in FIG. 4 to the BCP 21 when the messages Time_sync (TSB→CE), Time_sync (CE→TSB), Vs_mob_acq_ctl_msg (CE→TSB), Tc_ack_ctl_msg (TSB→CE), Bs_Ack_Order (TSB→CE) and Ms_Ack_Order (MS→CE) are transmitted and received upon the initial call establishment. Each of the trace report messages Msg_Cc_Call_Debug_Eb is composed of a message identifier msg_id, a job identifier job_id of the associated CE 22, a message bit mask value msg_type and message sequence information msg_seq.

When receiving such a trace report from the CE 22, the BCP 21 sends the traced result of the call establishing message between the MS 10 and CE 22 or between the CE 22 and vocoder 32 to a terminal of the operator at step ST19 or ST29.

Consequently, the operator is able to readily recognize the system situation on the basis of the transmission/reception traced information regarding a specific message, received at his terminal.

As apparent from the above description, according to the present invention, the call establishing message tracing method is capable of tracing call establishing messages transmitted and received among a specific mobile station, a specific channel element and a specific vocoder, set by the operator. Therefore, the operator can easily recognize message transmission/reception states of the system upon the initial call establishment or handoff, thereby enhancing a communication rate of the mobile station.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for tracing a call establishing message between a specific mobile station and a specific channel element in a code division multiple access mobile communication system, comprising the steps of:
    a) receiving information of a mobile station to be traced and the type of said call establishing message to be traced, from an operator;
    b) determining whether said specific mobile station is said mobile station to be traced, upon receiving a call establishing request from said specific mobile station, and sending a traffic channel establishing message to said specific channel element if said specific mobile station is said mobile station to be traced;
    c) receiving a trace report from said specific channel element receiving said traffic channel establishing message, when said call establishing message to be traced is transmitted and received; and
    d) sending the traced result of said call establishing message to a terminal of the operator upon receiving said trace report from said specific channel element.

2. The method as set forth in claim 1, wherein said mobile station information received at said step a) includes a mobile identification number or an electronic serial number of said mobile station.

3. The method as set forth in claim 1, wherein said step b) includes the step of comparing information of said specific mobile station with said mobile station information received at said step a), determining that said specific mobile station is said mobile station to be traced, if the information of said specific mobile station is equal to said mobile station information received at said step a), and determining that said specific mobile station is not said mobile station to be traced, if the information of said specific mobile station is not equal to said mobile station information received at said step a).

4. The method as set forth in claim 1, wherein said traffic channel establishing message sent at said step b) includes:
   a trace flag one-to-one corresponding to said specific channel element for indicating whether a tracing function will be performed with respect to said specific channel element; and
   a trace message composed of 16 bits for indicating the type of said call establishing message to be traced.

5. The method as set forth in claim 1, wherein said call establishing request received at said step b) is any one of a call originating request, a call terminating request and a call handoff request.

6. A method for tracing a call establishing message between a specific channel element and a specific vocoder in a code division multiple access mobile communication system, comprising the steps of:
   a) receiving information of a channel element to be traced and the type of said call establishing message to be traced, from an operator;
   b) assigning said specific channel element upon receiving a call establishing request from a specific mobile station, determining whether said specific channel element is said channel element to be traced and sending a traffic channel establishing message to said specific channel element if said specific channel element is said channel element to be traced;
   c) receiving a trace report from said specific channel element receiving said traffic channel establishing message, when said call establishing message to be traced is transmitted and received; and
   d) sending the traced result of said call establishing message to a terminal of the operator upon receiving said trace report from said specific channel element.

7. The method as set forth in claim 6, wherein said channel element information received at said step a) includes an identifier of said channel element or information of a shelf, slot and sub node in which said channel element is located.

8. The method as set forth in claim 6, wherein said step b) includes the step of comparing information of said specific channel element with said channel element information received at said step a), determining that said specific channel element is said channel element to be traced, if the information of said specific channel element is equal to said channel element information received at said step a), and determining that said specific channel element is not said channel element to be traced, if the information of said specific channel element is not equal to said channel element information received at said step a).

9. The method as set forth in claim 6, wherein said traffic channel establishing message sent at said step b) includes:
   a trace flag one-to-one corresponding to said specific channel element for indicating whether a tracing function will be performed with respect to said specific channel element; and
   a trace message composed of 16 bits for indicating the type of said call establishing message to be traced.

10. The method as set forth in claim 6, wherein said call establishing request received at said step b) is any one of a call originating request, a call terminating request and a call handoff request.

* * * * *